(12) United States Patent
Von Berg et al.

(10) Patent No.: US 7,440,609 B2
(45) Date of Patent: Oct. 21, 2008

(54) METHOD OF SEGMENTING A THREE-DIMENSIONAL STRUCTURE

(75) Inventors: Jens Von Berg, Hamburg (DE);
Vladimir Pekar, Hamburg (DE);
Michael Kaus, Hamburg (DE); Olivier Gerard, Viroflay (FR); Jean-Michel Rouet, Paris (FR); Sherif Makram-Ebeid, Dampierre (FR);
Maxim Fradkin, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 452 days.

(21) Appl. No.: 10/542,094

(22) PCT Filed: Dec. 15, 2003

(86) PCT No.: PCT/IB03/06255

§ 371 (c)(1),
(2), (4) Date: Jul. 13, 2005

(87) PCT Pub. No.: WO2004/063987

PCT Pub. Date: Jul. 29, 2004

(65) Prior Publication Data

US 2006/0126922 A1 Jun. 15, 2006

(30) Foreign Application Priority Data

Jan. 13, 2003 (EP) .................................. 03290078

(51) Int. Cl.
*G06K 9/00* (2006.01)
*G06K 9/34* (2006.01)
(52) U.S. Cl. ........................ 382/154; 382/128; 382/173; 382/277; 382/284; 345/418; 345/420; 600/407; 378/4

(58) Field of Classification Search ................. 382/133, 382/128, 13–132, 154, 171–173, 277, 284–285; 345/415–420, 419, 441; 600/407; 378/4
See application file for complete search history.

(56) References Cited

U.S. PATENT DOCUMENTS

| 5,412,563 A | 5/1995 | Cline et al. |
| 5,590,248 A | 12/1996 | Zarge et al. |
| 5,601,084 A | 2/1997 | Sheehan et al. |
| 5,689,577 A | 11/1997 | Arata |

(Continued)

FOREIGN PATENT DOCUMENTS

WO    WO 00/42575    7/2000

OTHER PUBLICATIONS

Cohen, I., et al.; Introducing new deformable surfaces to segment 3D images; 1991; IEEE; pp. 738-739.

(Continued)

*Primary Examiner*—Andrew W. Johns
*Assistant Examiner*—Nancy Bitar (57) ABSTRACT

The invention relates to a method for segmentation of a three-dimensional structure in a three-dimensional data set, especially a medical data set. The method uses a three-dimensional deformable model, wherein the surface of the model consists of a net of polygonal meshes. The meshes are split into groups, and a feature term is assigned to each group. After the model has been placed over the structure of interest, the deformable model is recalculated in consideration of the feature terms of each group.

9 Claims, 5 Drawing Sheets

U.S. PATENT DOCUMENTS

| | | | | |
|---|---|---|---|---|
| 5,894,308 A | * | 4/1999 | Isaacs | 345/420 |
| 5,999,188 A | * | 12/1999 | Kumar et al. | 345/423 |
| 6,100,893 A | | 8/2000 | Ensz et al. | |
| 6,106,466 A | * | 8/2000 | Sheehan et al. | 600/443 |
| 6,332,034 B1 | * | 12/2001 | Makram-Ebeid et al. | 382/128 |
| 7,167,172 B2 | * | 1/2007 | Kaus et al. | 345/419 |
| 7,327,862 B2 | * | 2/2008 | Murphy et al. | 382/128 |
| 7,376,252 B2 | * | 5/2008 | Gritzky et al. | 382/128 |
| 2003/0020714 A1 | | 1/2003 | Kaus et al. | |

OTHER PUBLICATIONS

Cohen, L.D., et al.; Deformable surfaces and parametric models to fit and track 3D data; 1996; IEEE; pp. 2451-2456.

Lorensen, W.E., et al.; Marching Cubes: High Resolution 3D Surface Contruction Algorithm; 1987; Computer Graphics; 21:4:163-169.

McInerney, T., et al.; Deformable Models in Medical Image Analysis: A Survey; 1996; Medical Image Analysis; 1(2)91-108.

* cited by examiner

METHOD OF SEGMENTING A THREE-DIMENSIONAL STRUCTURE

The invention relates to a method of segmenting a three-dimensional structure from a three-dimensional data record, containing in particular medical data values, using a deformable model. The surface area of the deformable model is formed by a network of meshes, the meshes connecting points of the network on the surface area of the model. The invention further relates to an image processing device for performing this method and to a computer program for controlling the image processing device.

A method of the kind mentioned at the beginning is known from an essay by McInerney et al. "Deformable models in medical image analysis: a survey" in the journal Medical Image Analysis, 1 (2):91-108, 1996. According to that article, a deformable model is represented as an elastic surface area which can, for example, change its shape and position by minimising the weighted sum of an internal and an external energy as they are called. The internal energy in this context can be of any magnitude, which is the smaller, the less the model is deformed, while the external energy can be of any magnitude, which becomes smaller as the deformable model approaches so-called candidate points, which are probably arranged on the surface area of the structure to be segmented. Among a predetermined number of points in the three-dimensional data record, a candidate point may, for example, be that point for which the probability of its being located on the surface area of the structure to be segmented is greatest. A measure of this probability is the structure function $F(x)$. The greater the value of the structure function $F(x)$, the greater is the probability that the point x in the three-dimensional data record is located on a surface area of the structure to be segmented.

In known methods, the meshes take the shape of a triangle, for example, the corners of which are defined by three adjacent points of the network on the surface area of the model. Along normal plane lines of the triangle plane candidate points are sought in the three-dimensional data record for which the structure function exhibits a maximum. In this context, the function $F(x)$ can, for example, be defined by the gradient of the data values at position x projected onto the normal plane line.

Once candidate points have been determined for the meshes of the network defining the surface area of the model, the points of the network of the model are recalculated on the basis of the candidate points found. In the process, the points of the network are calculated in such a way that for the newly found points of the network, the weighted sum of internal and external energy reaches a minimum. After that, the method is repeated several times, on the basis of the newly calculated points of the network, the model coming closer to the shape of the structure to be segmented with each repetition. This iterative method is completed as soon as a termination criterion, e.g. a specified number of repetitions, has been met.

One disadvantage of this method is that a structure function for the entire deformable model is used, so that structures whose surface areas have varying characteristics can only be segmented inadequately. This varying characteristic might, for example, be a gradient of the data values, which points in opposite directions for different parts of the surface area. In other known methods, each mesh or each triangle plane is allocated a structure function, which leads to a high level of computation effort. Apart from that, segmenting errors often occur with this method, since whenever there is a small deviation between the deformable model and the structure to be segmented, it is no longer possible to assign each structure function to the corresponding surface region of the structure to be segmented.

It is the object of the present invention to provide a method in which these segmenting problems are less pronounced. This object is achieved by a method of segmenting a three-dimensional structure from a three-dimensional data record, containing in particular medical data values, comprising the steps of:

a) providing a three-dimensional, deformable model whose surface area is formed by a network of meshes, which connect together points of the network on the surface area of the model, the meshes being divided into groups and each group being allocated a structure function, b) arranging the model at the position in the three-dimensional data record in which the structure to be segmented is located, c) determining one candidate point for each mesh with the aid of the structure function of the group to which the mesh concerned belongs, d) recalculating the points of the network of the model on the basis of the candidate points found, e) repeating steps c) and d), taking the newly calculated points of the network into account, as long as no termination criterion is met.

Unlike known methods, the meshes of a model according to the invention are divided into groups, and each group is assigned a structure function. This makes it possible to determine candidate points which are, with a high degree of probability, located on a surface area of the structure to be segmented, even in the case of a surface area which varies considerably in its characteristics, which leads to improved segmenting. The varying characteristic can, for example, be the direction of a gradient of the data values, as already mentioned above. Furthermore, this method requires less computation effort compared to assigning one structure function to each mesh.

In the embodiments according to claims 2 and 3, the meshes of a group have similar characteristics. Since similar characteristics in the meshes are due to similar characteristics of the corresponding surface regions of the structure to be segmented, forming groups in this way leads to a differentiation between different parts of the structure, e.g. the different parts of an organ or bone.

Claims 4 and 5 define preferred methods of determining candidate points.

Claim 6 defines a structure function, and claim 7 describes a preferred method of recalculating the points of the network, which leads to good segmenting results.

An image processing device for carrying out the method of the invention is described in Claim 8. Claim 9 defines a computer program for controlling the image processing device of Claim 8.

The invention will now be explained in more detail with reference to the drawings.

FIG. 6 shows two distributions of brightness values for the average data vectors of two groups, The image processing device shown in FIG. 1 comprises an image processing and control processor 1 with a memory 2, in which a deformable model of a structure to be segmented and a three-dimensional data record, containing in particular medical data values, can be stored. The image processing and control processor 1 can be coupled to an imaging device, which is not shown in more detail, such as a magnetic resonance or computer tomography device, e.g. by means of a glass fibre cable 3. The structure segmented by the image processing and control processor 1 can be reproduced on a monitor 4. The user can access the image processing and control processor 1 via a keyboard 5 or other input devices, which are not shown in more detail in FIG. 1.

Figure 1:
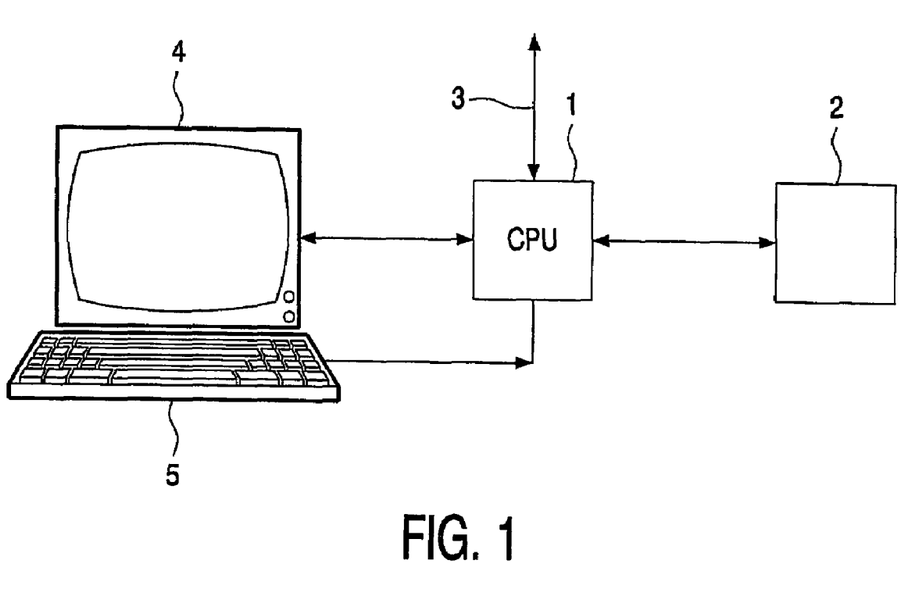
FIG. 1 shows an image processing device suitable for carrying out the method of the invention, in a schematic representation.
Figure 2:
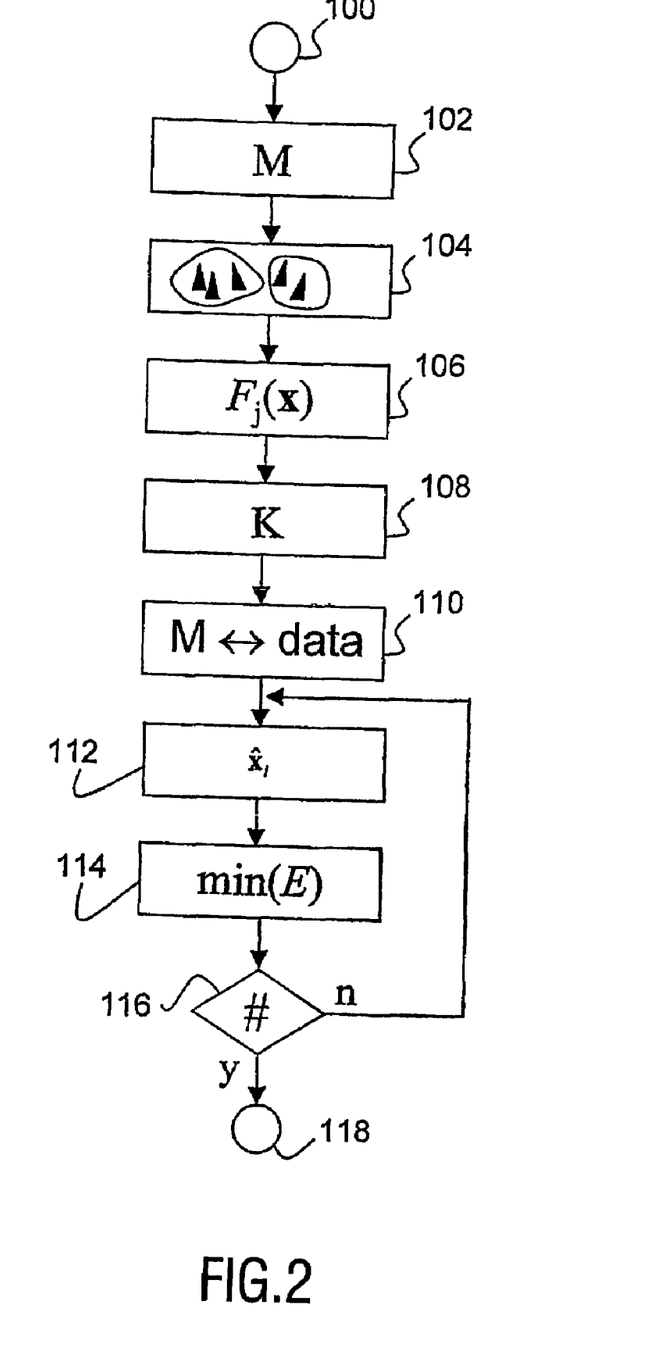
FIG. 2 shows a flow chart of the method of the invention.

FIG. 2 shows the sequence of a segmenting process which can be performed with the image processing device according to FIG. 1.

After initialisation in step 100, the deformable model of a structure to be segmented—in this working embodiment, that of a left heart ventricle—is provided in step 102. The surface area of the model in this connection is formed by a network of meshes which connect the points of the network on the surface area of the model. The meshes are in the shape of triangles, the corners of which are in each case defined by three adjacent points of the network on the surface area of the model. Instead of a model triangulated in this way, the surface area could also be defined by any polygonal structure in which the meshes of the network are not triangular, but which connect a number of points of the network, other than three, forming a polygon.

A deformable model can be generated from a plurality of training data records in each of which the same object has been segmented manually by a skilled person, and the surface areas of the segmented objects are represented by networks of the same topology. The same topology in this context means that each segmented object has the same number of meshes and that the same mesh has the same number of adjacent meshes in different training data records. If, therefore, the meshes in each data record are numbered and, for example, in the first data record mesh no. 1 has the adjacent meshes no. 2 to no. 9, mesh no. 1 is also adjacent to meshes no. 2 to no. 9 in all the other data records. Averaging, in the simplest case arithmetical averaging, over all the segmented objects leads to an object that is referred to as a deformable model.

The method of the invention can also be applied if the deformable model has been generated in a different manner in other embodiments, e.g. by the simple triangulation of a model of a left ventricle. One triangulation method which is frequently used is known from the Article "Marching cubes: A high resolution 3d surface area construction algorithm.", W. E. Lorensen and H. E. Cline, Computer Graphics, 21(3): 163-169, 1987.

The meshes of the deformable model are now divided up into groups in step 104, it being possible to perform the method of the invention with any method of division into groups.

Figure 3:
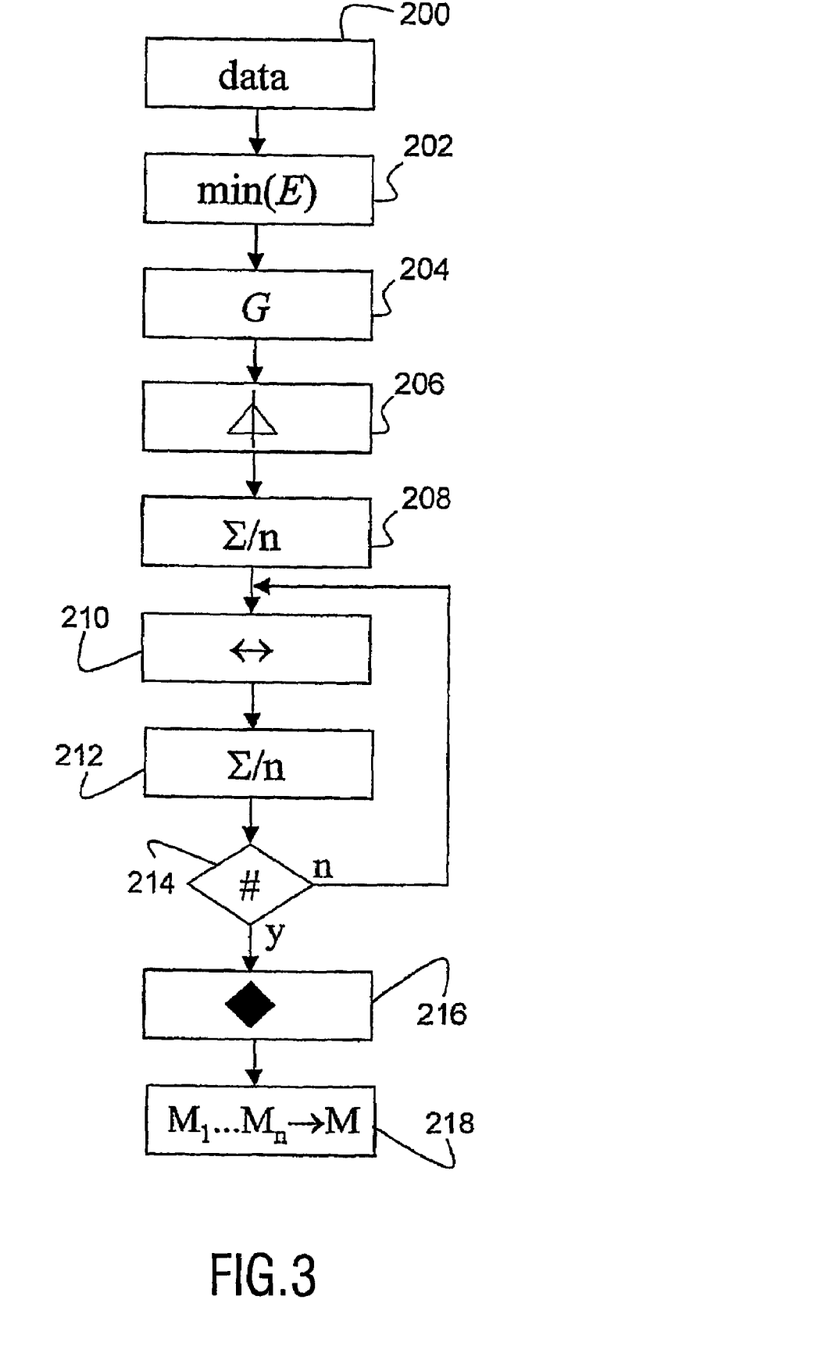
FIG. 3 shows a flow chart of a method for dividing meshes of a deformable model into groups.

One possible method of division into groups is shown in a first embodiment in FIG. 3. First of all, in step 200, N data records are generated, the data values of which each represent a left ventricle in this working embodiment. In step 202, the deformable model is then adapted to the ventricle in each data record in accordance with the known method which was described at the beginning, minimising the weighted sum of the internal and external energy, which leads to N models of the ventricle, all of which have the same topology.

In step 204, a number G of groups is selected, into which the triangle planes are divided. If the surface area of the structure to be segmented has different regions, which clearly differ from one another in the three-dimensional data record, the number G is preferably selected such that it is equal to the number of different surface area regions. This clear difference might, for example, be a gradient of the data values, which, for one surface region, is directed into the interior of the structure to be segmented, and, for another surface region, points to the outside. It is known that precisely these different gradient directions can occur with the left ventricle, so that in this working embodiment G=2 is selected.

In the subsequent step 206, a feature is assigned to each triangle plane of each model. This feature is a data vector, which contains the data values (in this case: brightness values) located on the normal of the triangle plane. The normal in this case runs through the central point of the triangle plane, and the data vector consists, for example, of data values located on the normal on one side of the triangle plane, one data value located on the triangle plane, and a further 10 data values located on the other side of or beyond the triangle plane. In other embodiments, different features could also be assigned to each triangle plane, e.g. the gradient of the data values in the position of the centre point of the area projected onto the normal. More than one feature per triangle plane is also possible.

An average feature of each group is determined in step 208. For this purpose, first of all a feature space containing all the values which features that have been assigned to the triangle planes can assume is divided into G sub-spaces. Then, an average value of the features is determined for each sub-space, and each average value of a sub-space is defined as a group feature. In this working embodiment, the feature space consists of the components of the data vectors, where each component can assume values between 0 and 511. The feature space is now subdivided into two sub-spaces. The features of the first space are data vectors whose components have values between 0 and 255, and the features of the second space are data vectors whose components have values between 256 and 511. Arithmetical averaging produces, as the average feature of the first sub-space, a data vector the components of which have the value 127.5. The average data vector of the second sub-space accordingly has the value 383.5. Thus the average feature of the first group, i.e. its group feature, is the data vector whose components have the value 127.5, and the corresponding feature of the second group is the data vector with the values 383.5.

In step 210, the assigned features of all the triangle planes are compared with all the group features with the aid of a similarity criterion. Each triangle plane is then assigned to the group whose group feature is most similar to the feature of the triangle plane according to the similarity criterion. The similarity criterion here can be any expression which compares features of the triangle planes or of the groups. This can, for example, be a correlation of the data vectors of two triangle planes to be compared or, as in this working embodiment, the norm of the difference between two data vectors.

After each triangle plane has been assigned to a group, in step 212 a new average feature is determined for each group, i.e. a new group feature in each case. For this purpose, the average of the assigned features of all the triangles in a group is determined; in this working embodiment, the average of the data vectors of the triangles is determined arithmetically. The result of the arithmetical averaging is the new group feature.

In step 214, there is a check on whether a termination criterion has been met. This termination criterion can, for example, be a predetermined number of iterations or a change in the group features that is so small as to be hardly present. If the termination criterion is met, the process continues with step 216. Otherwise, the method is continued with step 210.

Since the models in the different data records have the same topology, every model contains a triangle plane with the same neighbourhood relationships. Triangles with the same neighbourhood relationships can be contained in a plurality of groups or may even be present more than once in one group. In step 216, these triangles are assigned to the group in which these triangles are contained most frequently.

In step 218, a deformable model is generated from the N models by averaging, by determining the arithmetical average of, for example, the positions of all the triangle planes which have the same neighbourhood relationships.

This method is described in detail in "Pattern Classification and Scene Analysis", Duda and Hart, Wiley, 1973, to which reference is made here.

Figure 4:
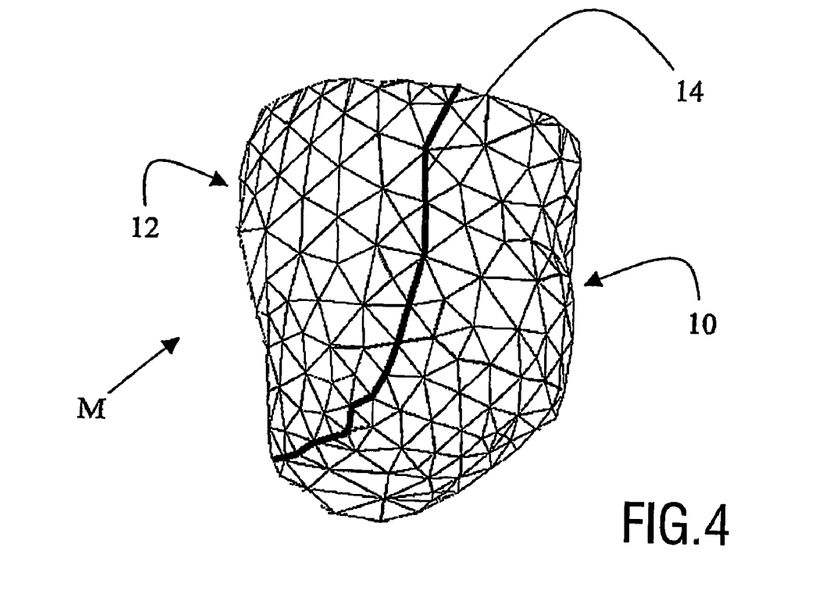
FIG. 4 shows a perspective view of a deformable model of a left heart ventricle.

The resulting first group 10, the second group 12 and the group border 14 of the deformable model M of the left ventricle are depicted in FIG. 4. The triangles which form the first group 10 in this model correspond to the region of the left ventricle which touches the right ventricle. I.e. the group assignment has made it possible to identify different parts of the heart. This identification of individual regions of the structure to be segmented is always possible whenever the characteristics of the structure detectable in the data record which distinguish the individual regions of the structure from each other are used as features for comparison by means of a similarity criterion. Identifying individual regions of the structure to be segmented by means of the group assignment makes it possible to extract these regions, so that they can be further processed separately from one another.

Figure 5:
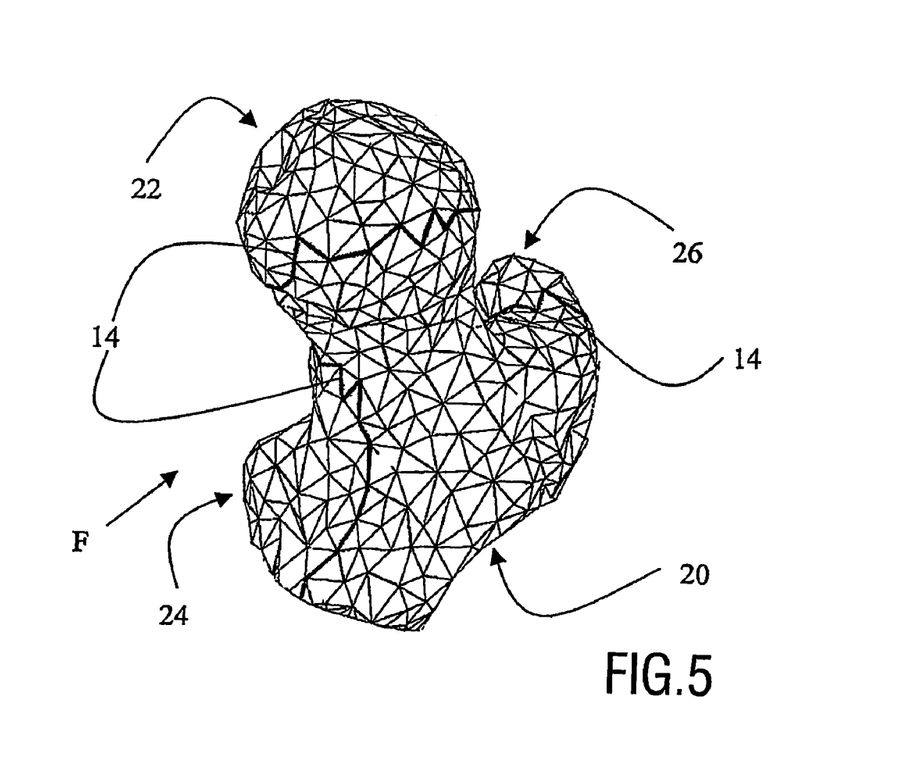
FIG. 5 shows a perspective view of a femur model.

A further example of this identification is shown in FIG. 5. That shows a triangulated model of a femur F, the triangle planes of which have been subdivided into four groups 20, 22, 24, 26 by means of the method of the invention described above. Here too, parts of the structure to be segmented have been identified by the group assignment. Thus group 22 defines the head of the femur, and group 26 the greater trochanter.

By selecting the features to be compared and the similarity criterion appropriately, it is thus possible to identify different parts of a structure to be segmented, e.g. of an organ or bone, which can then be extracted from the data record and processed individually.

In a different embodiment, in order to divide the triangle planes of the deformable model into groups, first of all a triangle is selected at random and its feature is compared with the feature of an adjacent, neighbouring triangle. Features in this case are the data vectors described above. The method can, however, also be carried out with other features. The comparison is made between the triangle planes, using the similarity criterion which has likewise been explained above, two triangle planes being regarded as similar if the similarity criterion is higher or lower than a predetermined threshold value. This might, for example, be when the threshold value of 0.9 is exceeded in the correlation of two data vectors or when the result falls short of the threshold value of 0.1 in the norm of the difference between two data vectors. If the two triangles are similar, the two triangles form a first group and one or more group features are determined by averaging the individual features of the triangles. In this working embodiment, the individual components of the data vectors could, for example, be averaged arithmetically, so that an average data vector is generated for that group. Then the same procedure is repeated with a further adjacent triangle, the data vector of that triangle being compared with the average data vector of the group. This method is continued until none of the triangles adjacent to the triangles of the group is similar to the average data vector of the group any longer. Then a further triangle which does not belong to any group is selected, with which the method described above is repeated, forming a second group. This procedure is repeated until every triangle has been assigned to a group.

A further embodiment of the group assignment procedure is manual assignment by an expert, who groups together the meshes which are similar with regard to one or more features of the structure to be segmented.

In step 106, a structure function is assigned to each group, a structure function being any function that furnishes a large value whenever there is a high degree of probability that a candidate point is located on the surface area of the structure to be segmented. Since different regions of the surface area of the structure to be segmented can have different characteristics, it is a good idea for these regions each to define a separate structure function.

A candidate point can define a candidate triangle plane. In this case, the candidate triangle plane is a triangle plane which has been displaced for the purposes of adaptation to a structure to be segmented in the direction of the normal of a triangle plane of the model. The candidate point is then the point where the candidate triangle plane and the normal intersect.

Figure 6:
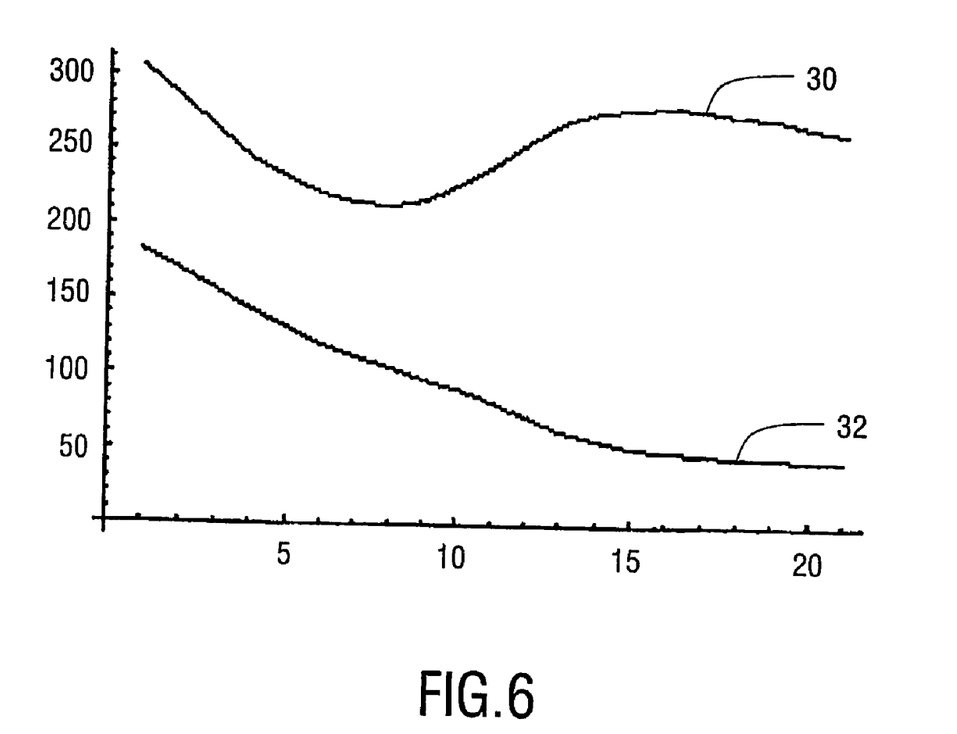

In order to determine the structure functions, the average of the features of the triangle planes of a group is determined, i.e. in this working embodiment the average of the corresponding data vectors, as already described above, if this has not already been done. The resulting group feature or the average data vector defines the structure function of the group. The average data vector 30 of group 10 and the average data vector 32 of group 12 is shown in FIG. 6. There, the brightness value has been plotted on the vertical axis, and an index has been plotted on the horizontal axis, which counts the data values along the normals.

The structure function in this working embodiment is a measure of the degree to which a feature of a candidate point or the candidate triangle plane defined by the candidate point is identical to the corresponding group feature; the similarity criterion described above can be used as a measure of the degree to which they are identical. Thus the structure function can, for example, be the reciprocal of the normal of the difference between the data vector of a candidate triangle plane and the data vector of the corresponding group.

For each mesh of the deformable model, a confidence is determined with a confidence criterion in step 108. The confidence of a mesh states how well a mesh matches its respective group. When the confidence is high, there is great certainty that the mesh concerned really could be assigned to the group concerned, because of its features. When the confidence is low, it is less certain that it belongs to a particular group.

One possibility of indicating a confidence criterion is the similarity criterion described above. If the features of a triangle and a group are very similar according to the similarity criterion, the confidence is also great. The result of the similarity criterion could thus be used directly as the confidence.

A further confidence criterion is firm shed by the group assignment shown in FIG. 3. In step 216 there, for triangle planes with the same neighbourhood relationships, or, after the average has been found for those triangle planes in step 218, for every triangle plane, the frequency with which it belongs to the group is determined. The greater that frequency is for a triangle plane, the better the features of that triangle plane match the group features. The frequency of belonging to the group can thus be used as confidence.

The deformable model of the left ventricle will be used in the following to segment a left ventricle in a three-dimensional data record automatically.

For this purpose, in step 110, the deformable model is first of all aligned relative to the structure to be segmented in such a way that the surface area of the model corresponds as well as possible to the contours of the structure to be segmented.

In step 112, a candidate point $\hat{x}_i$ is determined for each triangle plane on the surface area of the deformable model. The candidate point $\hat{x}_i$ here is located on the normal plane lines of the triangle and on a candidate triangle plane. The position of the candidate point $\hat{x}_i$ on the normal plane lines is now selected such that the structure function $F_j(\hat{x}_i)$ of the group to which the triangle plane concerned belongs exhibits a maximum. The indices i and j here indicate different candidate points or groups.

After a candidate point has been found for each of the triangle planes on the surface area of the deformable model, in step 114 the surface area of the deformable model is adapted to the candidate points found. To do this, the model is deformed in such a way that the so-called energy function $$E = E_{int} + \alpha E_{ext} \tag{1}$$

assumes a minimum. Here, $E_{ext}$ is the external energy which moves the triangle planes in the direction of the candidate points determined in step 112, while $E_{int}$ is the internal energy which opposes any deformation of the network. The weighting factor $\alpha$ is typically selected such that the two energies contribute to the total energy in equal measure.

The external energy chosen can be any parameter that becomes smaller as the deformable model approaches the structure defined by the candidate points. In this working embodiment, the external energy $E_{ext}$ is described by the following equation:

$$E_{ext} = \sum_\Delta w_i (x_i - \hat{x}_i)^2, \tag{2}$$

where all the triangles are summed. The weighting factor $w_i$ is calculated according to the following equation:

$$w_i = \max\{0, F_j(\hat{x}_i)\} \tag{3}$$

According to equation (3), candidate points $\hat{x}_i$, whose features correlate well with the features of the corresponding group of the model are weighted more heavily than other candidate points.

In other embodiments, the weighting factors $w_i$ could also take into account the confidence determined in step 108. Thus candidate points which exhibit a lower degree of confidence could contribute less to the external energy than candidate points for which a greater degree of confidence has been determined. It would also be possible to take into account the fluctuation margin of the group concerned. Candidate points in a group with a large fluctuation margin, i.e. in which the features of a number of triangle planes diverge considerably from the average feature of the group, ought to be taken into account with a lower weighting than candidate points in a group that exhibits a smaller fluctuation margin.

The internal energy $E_{int}$ can be any parameter that becomes smaller, the less the model is deformed. In this working embodiment, internal energy is calculated according to the relation V here is the number of triangle planes in the model, s a scaling factor, R a rotation matrix, and $\Delta_{ij}$ the distance between two centre points of two triangle planes of the original, undeformed model. The set N(i) contains the centre points of those triangle planes which are adjacent to the triangle plane with the centre point $x_i$. When the energy according to equation (1) is minimised for the first time, s=1, and R is the unit matrix.

After the centre points $x_i$ of the triangle planes of the deformed model have been determined by minimising the energy in accordance with equation (1), a new scaling factor s and a new rotation matrix R are determined. To do this, the current centre points $x_i$ are taken into account, and the scaling factor and rotation matrix are selected such that the internal energy becomes minimal. In other embodiments, the centre points $x_i$, the scaling factor s and the rotation matrix R could be determined simultaneously by having the scaling factor and the rotation matrix variable as well when determining the minimum of the total energy E.

After the deformable model has, in step 114, been adapted to the structure to be segmented, there is a check, in step 116, on whether a termination criterion has been met. This termination criterion can, for example, be a predetermined number of repetitions of steps 112 and 114 or a change in the position of the points of the network that is so small as to be hardly present. If the termination criterion is met, the segmenting procedure terminates in step 118. If, on the other hand, the termination criterion is not yet met, the method continues with step 112.

The model obtained according to the segmenting procedure can be stored and displayed on the monitor. It represents the segmenting of the structure to be segmented contained in the three-dimensional data record.

After steps 100 to 108 have been carried out once, one has a deformable model with meshes, which have been subdivided into groups, and with structure functions that have been assigned to the groups. For this reason, when segmenting further structures, it is possible to refer to this model, so that steps 104 to 108 can be dispensed with.

The invention claimed is:

1. Method of segmenting a three-dimensional structure from a three-dimensional data record, containing in particular medical data values, comprising the steps of:
    a) providing a three-dimensional, deformable model whose surface area is formed by a network of meshes, which connect together points of the network on the surface area of the model, the meshes being divided into groups and each group being allocated a structure function,
    b) arranging the model at the position in the three-dimensional data record in which the structure to be segmented is located,
    c) determining one candidate point for each mesh with the aid of the structure function of the group to which the mesh concerned belongs,
    d) recalculating the points of the network of the model on the basis of the candidate points found,
    e) repeating steps c) and d), taking the newly calculated points of the network into account, as long as no termination criterion is met.

2. The method as claimed in claim 1, step a) comprising the following steps:
    providing a three-dimensional, deformable model whose surface area is formed by a network of meshes, which connect together points of the network on the surface area of the model,
    comparing each mesh with each adjacent, neighbouring mesh with the aid of a similarity criterion, gathering together into groups neighbouring meshes which are similar in accordance with the similarity criterion, assigning a structure function to each group.

3. The method as claimed in claim 1, step a) comprising the following steps:

providing a three-dimensional, deformable model in each case in a plurality of data sets, all the models having the same number of meshes and the meshes in each model having the same neighbourhood relationships, gathering together the meshes of all the models into groups, assigning the meshes with the same neighbourhood relationships to the group in which those meshes are contained most frequently, assigning one structure function to each group, taking the average of the models of the three-dimensional data sets in order to determine a deformable model.

4. The method as claimed in claim 1, wherein the fact that, in step c), from a set of points, that point is selected as the candidate point of a mesh for which the structure function exhibits an extreme, especially a maximum.

5. The method as claimed in claim 1, wherein the fact that, in step c), a candidate point of a mesh is found in that position on a normal of the surface area enclosed by the mesh at which the structure function exhibits an extremum, especially a maximum.

6. The method as claimed in claim 1, wherein the fact that the value of the structure function in a particular position in the three-dimensional data record is a measure of the probability that that particular position is located on a surface area of the structure to be segmented.

7. The method as claimed in claim 1, wherein the fact that, in step d), the points of the network are recalculated, while minimising a weighted sum of external and internal energy.

8. An image processing device for performing the method of claim 1 with a memory unit for storing at least one deformable model whose surface area is formed by a network with meshes connecting points of the network on the surface area of the model, and for storing at least one three-dimensional data record, containing in particular medical data values, an image reproduction unit for reproducing a structure to be segmented, or already segmented, and the at least one deformable model, a calculator unit for recalculating the points of the network of the at least one model, an arrangement unit for arranging the model, at the position in the three-dimensional data record at which the structure to be segmented is located, a control unit for controlling the memory unit, the image reproduction unit, the calculator unit and the arrangement unit in accordance with the following steps:

a) providing a three-dimensional, deformable model whose surface area is formed by a network of meshes, which connect together points of the network on the surface area of the model, the meshes being divided into groups and each group being allocated a structure function, b) arranging the model at the position in the three-dimensional data record in which the structure to be segmented is located, c) determining one candidate point for each mesh with the aid of the structure function of the group to which the mesh concerned belongs, d) recalculating the points of the network of the model on the basis of the candidate points found, e) repeating steps c) and d), taking the newly calculated points of the network into account, as long as no termination criterion is met.

9. A computer-readable medium comprising a computer program for a control unit for controlling a memory unit, an image reproduction unit, a calculator unit and an arrangement unit of an image processing device for carrying out the following steps:

a) providing a three-dimensional, deformable model whose surface area is formed by a network of meshes, which connect together the points of the network on the surface area of the model, the meshes being divided into groups and each group having a structure function, b) arranging the model at the position in the three-dimensional data record in which the structure to be segmented is located, c) determining one candidate point for each mesh with the aid of the structure function of the group to which the mesh concerned belongs, d) recalculating the points of the network of the model on the basis of the candidate points found, e) repeating steps c) and d), taking the newly calculated points of the network into account, as long as no termination criterion is met.

\* \* \* \* \*